US011887160B2

(12) United States Patent
Korada et al.

(10) Patent No.: US 11,887,160 B2
(45) Date of Patent: Jan. 30, 2024

(54) REAL TIME BIDDING ENGINE WITH RADIUS INSIGHTS

(71) Applicant: Zeta Global Corp., New York, NY (US)

(72) Inventors: Pavan Korada, San Rafael, CA (US); RC Rizza, New York, NY (US); Jolene Liu, Long Island, NY (US); Phillip Eby, Fort Worth, TX (US)

(73) Assignee: Zeta Global Corp., New York, NY (US)

( * ) Notice: Subject to any disclaimer, the term of this patent is extended or adjusted under 35 U.S.C. 154(b) by 0 days.

(21) Appl. No.: 17/733,618

(22) Filed: Apr. 29, 2022

(65) Prior Publication Data

US 2022/0351244 A1 Nov. 3, 2022

Related U.S. Application Data

(60) Provisional application No. 63/182,340, filed on Apr. 30, 2021.

(51) Int. Cl.
*G06Q 30/0251* (2023.01)
*G06Q 30/0242* (2023.01)
*G06Q 30/0273* (2023.01)

(52) U.S. Cl.
CPC ..... *G06Q 30/0261* (2013.01); *G06Q 30/0244* (2013.01); *G06Q 30/0246* (2013.01); *G06Q 30/0275* (2013.01)

(58) Field of Classification Search
None
See application file for complete search history.

(56) References Cited

U.S. PATENT DOCUMENTS

2006/0224447 A1* 10/2006 Koningstein ...... G06Q 30/0283
705/14.66
2009/0049097 A1* 2/2009 Nocifera ............... H04L 65/611
709/224

(Continued)

OTHER PUBLICATIONS

F. Screen captures from YouTube video clip entitled "Creating Radius and Summarizing Demographics with Map Business Online", 1 page, uploaded on Sep. 10, 2019 by user "MapBusinessOnline" (Year: 2019).*

*Primary Examiner* — Sam Refai
(74) *Attorney, Agent, or Firm* — Schwegman Lundberg & Woessner, P.A.

(57) ABSTRACT

The subject technology provides a targeted content curation and placement optimization system comprising a processor connected to a publication network, the publication network navigated by an online consumer seeking actionable content. An online demand side portal is accessible, via the publication network, to a content provider. An online supply side portal is accessible, via the network, to a publisher of content on the publication network. An integrated bidding exchange is communicatively coupled to the demand side portal and the supply side portal and presents user interfaces enabling receipt of bids from the content provider for placement of content by the publisher at a specified location or domain on the publication network. A geographic insights generator may generate geo-specific intender attributes that may be used to curate the targeted content and optimize one or more bidding parameters of the content provider.

20 Claims, 9 Drawing Sheets

(56) References Cited

U.S. PATENT DOCUMENTS

2014/0316893 A1* 10/2014 Yeh .................. G06Q 30/02
                                                  705/14.55
2016/0098748 A1*  4/2016 Dittus ............... H04N 21/4758
                                                  705/14.53
2016/0260136 A1*  9/2016 Schwartz .......... G06Q 30/0277

* cited by examiner

FIG. 4

REAL TIME BIDDING ENGINE WITH RADIUS INSIGHTS

CLAIM OF PRIORITY

This patent application claims the benefit of priority, under 35 U.S.C. Section 119(e), to Korada et al, U.S. Provisional Patent Application Ser. No. 63/182,340, entitled "REAL-TIME BIDDING ENGINE WITH RADIUS INSIGHTS," filed on Apr. 30, 2021, which is hereby incorporated by reference herein in its entirety.

TECHNICAL FIELD

The subject matter disclosed herein generally relates to the technical field of systems and methods for targeted content curation and placement optimization in a network-based publication environment. Some examples relate to methodologies to optimize targeted content, digital media spend, and brick locations for particular geographic areas.

BACKGROUND

The present subject matter seeks to address technical problems existing in targeted content curation and placement optimization in a network-based publication environment. Characterizing the behavior of consumers in a particular geographic region and ensuring engagement is difficult to accomplish. In known systems, marketers bid on available inventory of ad placement space in a bid stream and blindly hope that an end consumer views the targeted creative content placed in the available inventory. Marketers also blindly hope that the content views boost sales, store visits, and other key performance indicators (KPIs). When a marketer bids on a placement, they do not know how engaged the user is, i.e., if the user is interested in what they are promoting or even if they will view the advertisement at all. Similarly, for a given placement location in the inventory, publishers are typically only able to monetize a given placement one time and present only one creative content item from one marketer.

Conventional targeted content and placement systems fail to provide multiple response or interaction layers or intender attributes for identifying the types of products, brands, and content that are likely to engage consumers. Here, enabling the participation of many parties or tenants in an active networked economy (for example, marketers, publishers, consumers, retailers, service providers, and so forth) can be difficult. For example, data for targeted content curation may be aggregated from different sources, but each source will likely have different methods of data protection with which to comply. Each source will also very often have different data content and configuration, and this may conflict with data configuration of other sources. This aggregation of disparate sources of protected information presents technical challenges, particularly in multi-tenant networks or environments.

In other aspects, user interfaces and data structures pertaining to the creation and presentation of targeted content, while having advanced in recent years, have not been optimized for use in a cross number of verticals and also for the management of more complicated subscription arrangements between providers and consumers. In particular, the lack of geographic location based analysis makes boosting KPIs in a particular location impossible. Accordingly, it is desirable to generate geo-specific attributes from desperate datasets in order to curate and place content that effectively targets consumers in a particular geographic region.

BRIEF DESCRIPTION OF THE DRAWINGS

The accompanying figures, which are incorporated in and constitute a part of this specification, illustrate one or more embodiments of the present disclosure and, together with the description, help to explain embodiments of the present disclosure. Some embodiments are illustrated by way of example and not limitation in the figures of the accompanying drawings.

FIG. 4 illustrates tags which can be applied while implementing system for aggregating event level data, according to various embodiments of the present disclosure.

DETAILED DESCRIPTION

Figure 1:
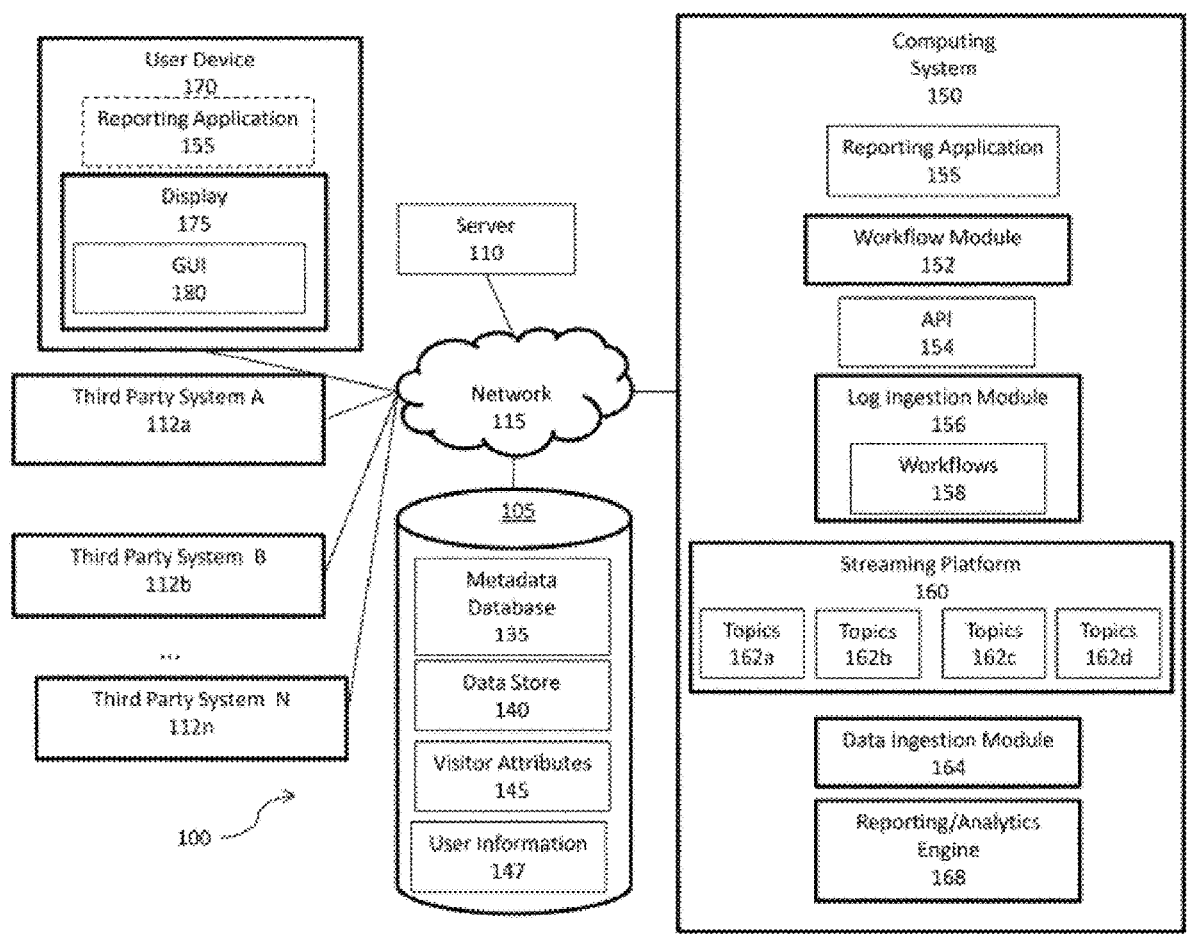
FIG. 1 is network diagram of a system for aggregating event level data, according to various embodiments of the present disclosure.

The description that follows includes illustrative systems, methods, techniques, instruction sequences, and computing machine program products that embody illustrative embodiments. In the following description, for purposes of explanation, numerous specific details are set forth in order to provide an understanding of various embodiment of the inventive subject matter. It will be evident, however, to those skilled in the art that embodiments of the inventive subject matter can be practiced without these specific details. In general, well-known instruction instances, protocols, structures, and techniques have not been shown in detail. It should be understood by those with skill in the art may combine elements from various embodiments in practicing the present invention.

In some examples, the targeted content curation and placement optimization system may display actionable targeted content to users at a particular location or domain within a publication network. Responses to the actionable targeted content and other user engagement may be captured and used to derive impression data and other event level data as well as consumer data that may provide more insight into the demographics, location, financial situation, online browsing behavior, and/or preferences of each user navigating to the particular location or domain. The impression data and consumer data may be used to resolve and or enrich consumer identity profiles associated with each user. The targeted content curation and placement optimization may extract one or more consumer attributes from the consumer identity profiles and determine a subset of the consumer attributes for consumers in a particular geographic location (i.e., geo-specific intender attributes). The geo-specific intender attributes, impression data, consumer data, and/or enriched consumer identity profiles may be used to improve the selection of targeted content and a bidding process for the placement of targeted content at a particular location or domain in the available inventory of a publisher. For example, the targeted content curation and placement optimization may generate or select targeted content for display, select or prioritize a marketer or other content provider for a particular placement, or adjust the price per placement or other parameters of a bidding process, based on one or more of the geo-specific intender attributes, impression data, consumer data, and or enriched consumer identities.

According to various embodiments, a system and method are provided to generate real-time values determined based on aggregated data from disparate systems. The described systems and methods are directed to accurately tracking and reporting on values associated with intender consumer geographies. In this regard, the data from disparate systems determines geographic density of intender consumers overlayed with actual brick and mortar locations.

In at least one embodiment, the described system ingests impression-level and/or aggregated data from multiple data sources and or third party systems (such as vendors). The system calculates geographic map of intender consumers to determine proximity to store locations.

In accordance with embodiments of the present disclosure, each third party system of multiple of third party systems is configured to store files including datasets of different types, associated with one or more campaigns. Each dataset can be associated with a unique transaction ID. A computing system can be in communication with the third party systems ad include a first database and a second database. The computing system can be configured to receive a selection of one or more third-party systems. Each of the one more third-party systems is configured to store one or more files of the plurality of files, including datasets associated with at least one campaign of the one or more campaigns. The computing system can further stream the one or more files including the datasets associated with the at least one campaign from each of the one or more third party systems, aggregate each of the datasets from the one or more files into one or more groups based on the unique transaction ID associated with each of the datasets and store the one or more groups of the datasets in the first database. The computing system can retrieve information associated with the at least one campaign and a user of the user device from the second database, calculate one or more values associated with the at least one campaign based on the one or more groups of datasets and the information associated with the at least one campaign and a user, and generate a report including the one or more values.

FIG. 1 is network diagram of a system 100 for aggregating event level data in accordance with and exemplary embodiment The system 100 for aggregating event level data can include one or more data sources 105, one or more servers 110, one or more third party systems A-N 112*a-n*, one or more computing systems 150, and one or more user devices 170. The computing system 150 can be in communication with the data sources 105. server(s) 110, the third party systems A-N 112*a-n*. and the user devices 170, via a communications network 115.

The computing system 150 can execute a reporting application 155, workflow module 152, log ingestion module 156, data ingestion module 164, and a reporting/analytics engine 168 to implement the system 100 for providing real-time values determined based on aggregated data from disparate systems. The computing system 150 can also include a streaming platform 160 and an Application Program Interface (API) service 154 to communicate with the streaming platform 160. The one or more user devices 170 can execute an instance of the reporting application 155, hosted by the computing system 150, and/or can interface with the computing system, which can execute an instance of the application on behalf of the one or more user devices 170. The one or more user devices 170 can include a display 175 for rendering a graphical user interface (GUI) 180.

In an example embodiment, one or more portions of the communications network 115, can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi Fi network, a WiMax network, any other type of network, or a combination of two or more such networks.

The server 110 includes one or more computers or processors configured to communicate with the computing system 150, third party systems A-N 112*a-n* and user devices 170, via the communications network 115. The data sources 105 may store information/data, as described herein. For example, the data sources 105 can include multiple databases, including a metadata database 135, a data store database 140, a visitor attributes database 145, and a user information database 147. The metadata database 135 can store metadata associated with campaigns. The data store database 140 can data associated with campaigns ingested from the third party systems A-N 112*a-n*. The visitor attribute database 145 can store data associated with data derived/calculated/determined during an enrichment process. The user information database 147 can store information associated with users such as information associated with a user's contracts with the third party systems A-N 112*a-n* for services provided to the user. The data sources 105 can be located at one or more geographically distributed locations from the computing system 150. Alternatively, the data sources 105 can be located at the same geographic location as the computing system 150.

In one embodiment, the computing system 150 can receive a request to initiate a campaign and a selection of third party systems A-N 112*a-n*, from the user device 170. The computing system 150 can execute the workflow module 152 in response to receiving request to initiate a campaign and a selection of third party systems A-N 112*a-n*. The workflow module 152 can call the API service 154 to initiate a campaign setup, specifying the selection of third party systems A-N 112*a-n* to be included in the campaign as well as the metadata associated with the campaign.

The API service 154 can store the metadata associated with the campaign in the metadata database 135. As a non-limiting example, the metadata can include one or more of campaign ID, line ID, ad ID, and creative ID. The API service 154 can create workflows 158 in the log ingestion module 156 for each of the selected third party systems A-N 112*a-n*. Each of the workflows 158 can download files from each of the selected third party systems. The files can include impression/event-level logs associated with the campaign.

Impressions can be embodied as a view or ad view referring to a point at which an ad is viewed by a user and/or displayed on a web page. The number of impressions of a particular campaign can be determined by the number of times a particular webpage with the advertisement is located and/or loaded. As an example, the files can be posted by the third party systems A-N 112*a-n* to a Secure File Transfer Protocol (SFTP), File Transfer Protocol (FTP), Google Cloud Storage, and/or Amazon Web Services (AWS) S3 bucket.

Each workflow 158 streams the downloaded files to a specific topic 162 in a streaming platform 160. In one embodiment, the topics 162 can be associated with a type of third party system A-N 112*a-n*. The workflows 158 can stream the files to the respective topics 162 based on the type of third party system A-N 112*a-n* the files were downloaded from. The data ingestion module 164 can execute an enrichment and/or an extract, transform, load (ETL) process on the files streamed in the different topics 162. During the ETL process, the data ingestion module 164 can break down the datasets from the files. Each of the datasets can be associated with a unique transaction ID. The data ingestion module 164 can validate the unique transaction ID, aggregate, join, and/or merge datasets from different third party systems A-N 112*a-n*, based on the unique transaction ID. The enrichment and ETL process will be described in further detail with respect to FIG. 3. The data ingestion module 164 can read the datasets in the log lines of the files from each respective topic, map the datasets from the log lines into fields of a common (normalized) format, transform the datasets, and load the datasets for storage in the data store database 140.

A unique transaction ID can be assigned to each dataset in each of third party system using tags disseminated by the computing system 150. The tags can be code (e.g., HTML) embedded in and assigned to datasets such as impressions, links, and/or other event level data associated with a particular campaign. The tags can identify types of datasets. For example, the tag can be a display tag, a video tag, creative tag, and/or a specialized tag. The unique transaction ID can be generated at execution of an impression. Tags will be described in further detail with respect to FIG. 4.

The reporting/analytics engine 168 can retrieve/read the datasets stored in the data store database 140. Additionally, the reporting/analytics engine 168 can retrieve information associated with the user of the user device, from the user information database 147. For example, the information associated with the user of the user device can be contract data associated with contract for services between the user and the third party systems A-N 112*a-n*. The reporting/analytics engine 168 can calculate values associated with the campaign using the aggregated datasets from the groups and the contract data. The reporting analytics engine 168 can generate a report including the calculated values.

The reporting application 155 can generate a GUI 130 rendering the generated report. The instance of the reporting application 155 executing on the user device 170 can render the GUI 180 on the display 175 of the user device.

As a non-limiting example, the system 100 for providing real-time values determined based on aggregated data from disparate systems, can be implemented to costs and billing of services provided for digital media ad campaigns. The system 100 for aggregating event level data can calculate costs and fees associated with the services to provide an accurate depiction of cost and return of investment (ROI). The user device 170 can be associated with a user implementing a digital media campaign. The user can be an entity such as a company, organization, corporation, partnership, individual, educational institution, and/or any other type or entity implementing digital media campaigns. The third party systems A-N 112*a-n* can be vendors associated with a digital media ad campaign. The contracts for services can be between the user of the user device and the vendors. The services can be for providing digital media campaigns. For example, the services can be associated with displaying links, videos, images, and other ad material on a vendor's website. The vendors can be one or more of trackers, an ad server, an execution platform, and a measurement platform. The files received from vendors can include datasets associated with at least one of, trackers (a proprietary data source), cost data, measurement data, and ad server data. The trackers can track real-time events on digital media (e.g., the internet), such as click counts. In this regard, the files associated with the trackers can include event level data. The attributes associated with the real-time events on digital medial derived/calculated/determined during an enrichment process can be stored in the visitor attributes database 145. The calculated values associated with the campaign using the aggregated datasets from the groups and the contract data included on the generated report can be cost and billing reporting.

In at least one embodiment, users can input rates (as defined by their own contracts with that vendor) for specific services from each vendor that can be used in the delivery and measurement of a digital media ad impression, via the user device 170. The user device 170 can transmit the input rates to the computing system 150. In the event the service is included in the delivery/measurement of a digital media ad, a tracking URL for that vendor is included in the tag, such as an ad tag, which is disseminated to the vendor. An event/impression associated with the digital media ad can be tracked based on the tag. Datasets including event and/or impression data and any other relevant data can be ingested by the computing system 150, as described above. The reporting/analytics engine 168 can apply the received input rates for the specified vendor and the service that was used on the digital media ad impression to accurately calculate the cost to be applied.

Data associated with each vendor involved in the digital media campaign, along with the combination of each creative and ad, can be stored to provide a high level of granularity for reporting. The contract data associated with each vendor can be applied to determine and represent costs incurred on each impression served through a particular creative and ad combination.

Figure 2:
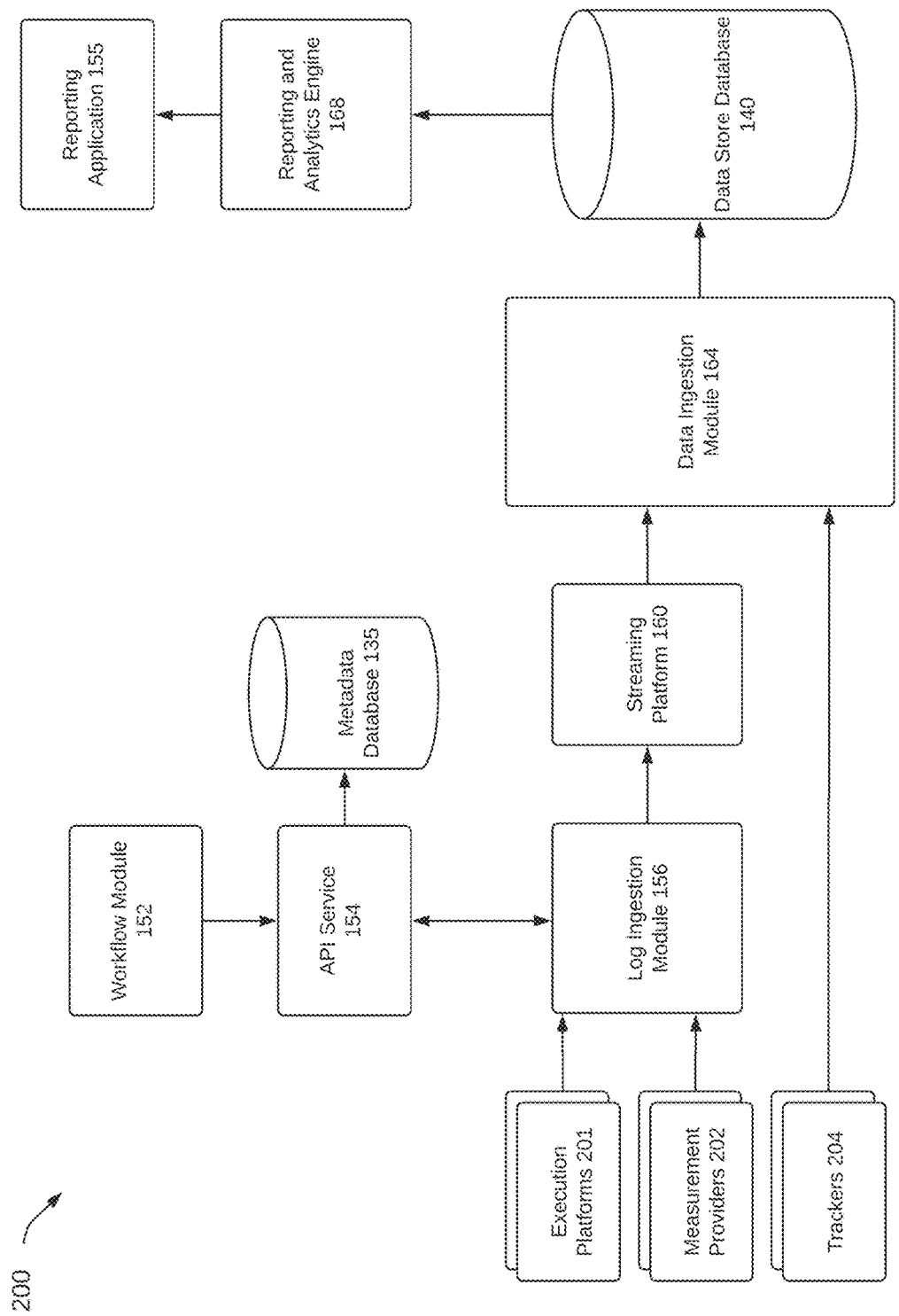
FIG. 2 illustrates an architecture for implementing the system for aggregating event level data, according to various embodiments of the present disclosure.

FIG. 2 illustrates an architecture 200 for implementing the system for aggregating event level data in accordance with and exemplary embodiment. A workflow module 152 can call an API service 154 to initiate a campaign setup by specifying the specific vendors to be included in the campaign and on which vendor to execute the campaign buying, as well as credentials for each vendor. The vendor can be a third party system (e.g., third party system A-N 112*a-n*). As an example, the vendors can be execution platforms 201, measurement providers 202, and trackers 204. The workflow module 152 can also provide the API service 154 metadata associated with the campaign. The API Service 154 can store metadata provided by workflow module 152 in a metadata database 135. The metadata database 135 can be embodied as a Postgres database.

The API Service 154 can create workflows in the log ingestion module 156. The log ingestion module 156 can be embodied as, for example, Conflux. The workflows can download files such as impression/event-level logs for each of the vendors used by the client. As an example, the execution platforms 201 and measurement providers 202 can post log files to an SFTP location, an FTP location, Google Cloud Storage, and/or AWS S3 bucket. The workflows can stream the files into topics in a streaming platform 160 such as Apache Kafka. Apache Kafka is a streaming platform which allows systems and users to subscribe and publish data to any number of systems and real-time applications. The data can be received by Apache Kafka and partitioned by topics. The topics can be specified. For example. the topics can be specified based on the type of dataset (i.e., trackers, cost data, measurement data, and/or ad server data). Trackers 204 can stream respective files directly to the streaming platform 160.

The data ingestion module 164 can receive the streamed files from the different topics from the streaming platform 160. The data ingestion module 164 can read the datasets in the log lines of the files from each respective topic, map the datasets from the log lines into fields of a common (normalized) format, transform the datasets, and load the datasets for storage in the data store database 140. The data ingestion module 164 also receives delivery events streamed by trackers 204, from the streaming platform 160, performs various enrichments to these events, and streams the events into the data store database 140 or other distributed storage system. The data store database 140 can be embodied as, for example, a Hadoop Distributed File System (HDFS)/Hive data warehouse.

A reporting/analytics engine 166 can include a reporting platform and an analytics platform. The reporting/analytics engine 166 can calculate values associated with the campaign, as described above. The reporting platform reads and/or retrieves the datasets from the data store database 140 and loads it into an analytics platform. The analytics platform can execute necessary aggregations to generate a report including the calculated values. The reporting platform can be embodied as, for example, Vega and the analytics platform can be, for example, HPE Vertica. The analytics platform can provide the discrepancy report to a reporting application 155 to provide the discrepancy report to a user device (e.g., user device 170 as shown in FIG. 1).

Figure 3:
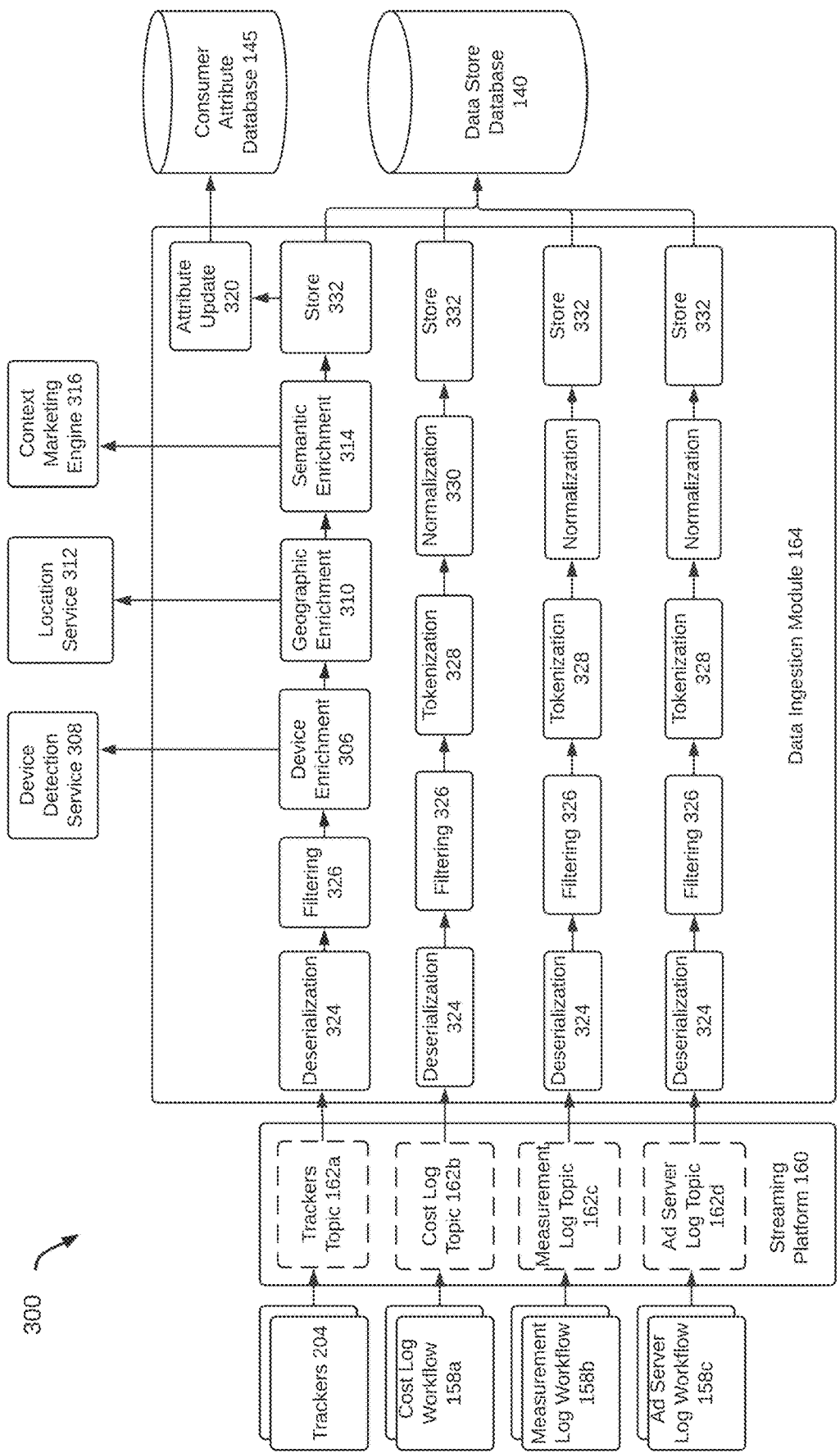
FIG. 3 illustrates an architecture for implementing the delivery and log ingestion, according to various embodiment of the present disclosure.

FIG. 3 illustrates an architecture 300 for implementing the data ingestion module 164 in accordance with an exemplary embodiment. As described with respect to FIG. 2, impression/event-level log files are received from different third party systems (vendors) and are classified, based on the type of third party systems: trackers (a proprietary data source), cost data, measurement data, and ad server data. Workflows are generated based on the type of dataset and/or third party system. As an example, a cost workflow 158*a*, a measurement workflow 158*b*, and an ad server log workflow 158*c*, can be created. As also described with respect to FIG. 2, files are posted by the third party system to an SFTP location, an FTP location, Google Cloud Storage, and/or an AWS S3 bucket. The files are downloaded from the respective locations and streamed to a streaming platform 160 (e.g., Apache Kafka). The streaming platform 160 can convert the files into a Java stream. The Java stream can be loaded into a streaming application used by the data ingestion module 164, such as Conflux spark. Files including event level datasets can be streamed from trackers 204 to the streaming platform 160.

The streaming platform 160 can partition the incoming files by topics. As shown in FIG. 3, the trackers 204 can stream files including event level data to the trackers topic 162*a*, cost log workflow 158*a* can stream cost log files into the cost log topic 162*b*, the measurement log workflow 158*b* can stream the measurement log files to the measurement log topic 162*c*, and the ad server log workflow 158*c* can stream the ad server log files to the ad server log topic 162*d*. In response to being loaded into the data ingestion module 164, the data ingestion module 164 can execute the ETL process on, the cost log files, measurement log files, and the ad server log files.

The ETL process can include a deserialization operation 324, a filtering operation 326, a tokenization operation 328, a normalization operation 330, and a store operation 332. In the deserialization operation 324 the datasets in the cost log, measurement log, and ad server files are broken down to extract the raw data from the files and create new objects. In the filtering operation 326, the datasets and/or event level data that do not have a valid transaction ID can be removed. The transaction ID can be a unique ID generated at the execution or an impression that is disseminated to the third party systems through a tag. As described above, tags can be code such as HTML, used to track/identify datasets in third party systems, such as event and/or impression level data. In the filtering operation 326, datasets associated with any impression that is flagged as having been served to an IP address marked by the IAB Bots and Spiders List as non-human traffic, can be removed.

In the tokenization operation 328, the datasets from different third party systems can be aggregated, joined, and/or merged based on the transaction ID associated with each of the datasets. During the tokenization operation 328 each or the datasets can be aggregated from the one or more files, into one or more groups based on the unique transaction ID associated with each of the datasets. The datasets associated with impression event records from different third party systems can be matched (i.e., grouped). The data points passed from each third party system can be broken down into distinct objects so the datasets can be reassembled into a coherent dataset. In the normalization operation 330, the datasets from the different third party systems can be reassembled into a structured data format (e.g., columns) that allows for creation of a readable dataset combining data from all third party systems. In the store operation 332, the reassembled datasets are prepared and stored in the data store database 140 (i.e., Hive data warehouse).

The data ingestion module 164 can execute an enrichment process on the event level data streamed through the trackers 204. The enrichment process can include a deserialization operation 324, a filtering operation 326, a device enrichment operation 306, a geographic (geo) enrichment operation 310, a semantic enrichment operation 314, and a store operation 318. The deserialization operation 324, and filtering operation 326, can be executed as described above with respect to the ETL process. In the device enrichment process 306, the device and (internet) browser data associated with the event level data can be determined based on a user agent from the (internet) browser associated with the event level data, using a file provided by a device detection service 308 (e.g., DeviceAtlas). The device detection service 308 can be used to analyze web traffic device detection. The device detection service 308 is a platform configured to provide data on all mobile and connected devices including smartphones, tablets, laptops, and wearable devices. It can be appreciated sources other than the device detection service 308 can be used to provide the same data.

In the geographic enrichment operation 310, IP addresses of the user viewing the impression event associated with the event level data can be extracted. A file provided by a location service 312 such as Neustar can be used to look up the geographic location of the IP address. The location service 312 is a platform that can provide real-time information and analytics such as the geographic location associated with a particular IP address. It can be appreciated sources other than the location service 312 can be used to provide the same data.

In the semantic enrichment operation 314, a Uniform Resource Locator (URL) from a website of the impression event associated with the event level data is captured and transmitted to a context marketing engine 316 such as Grapeshot. The context marketing engine 316 can return a specified number (i.e., top five) classification (in IAB categories) for the website or provide other codes that summarize the content of the website. The context marketing engine is a platform to segment inventory and improve target marketing. It can be appreciated sources other than the context marketing engine can be used to provide the same data.

In the store operation 318, the resultant data from the deserialization operation 324, filtering operation 326, device enrichment operation 306, geographic (geo) enrichment operation 310, and semantic enrichment operation 314 can be stored in the data store database 140. Additionally, the resultant data from the device enrichment operation 306, geographic (geo) enrichment operation 310, and semantic enrichment operation 314 can be stored as user attribute data in the visitor attribute database 145. In various embodiments an attribute update operation 320 may add attributes for users to a user profile maintained in the visitor attribute database 145. The visitor attribute database 145 may be implemented as a data cloud, identity graph, or other data storage platform.

In various embodiments, the system ingests datasets from files, from different impression-level and aggregated streams. Such datasets can come directly from each vendor involved in serving or measuring an impression. Once the data is ingested, an ETL process is executed to join data together based on a transaction ID passed to each vendor via creative tags.

Figure 4:
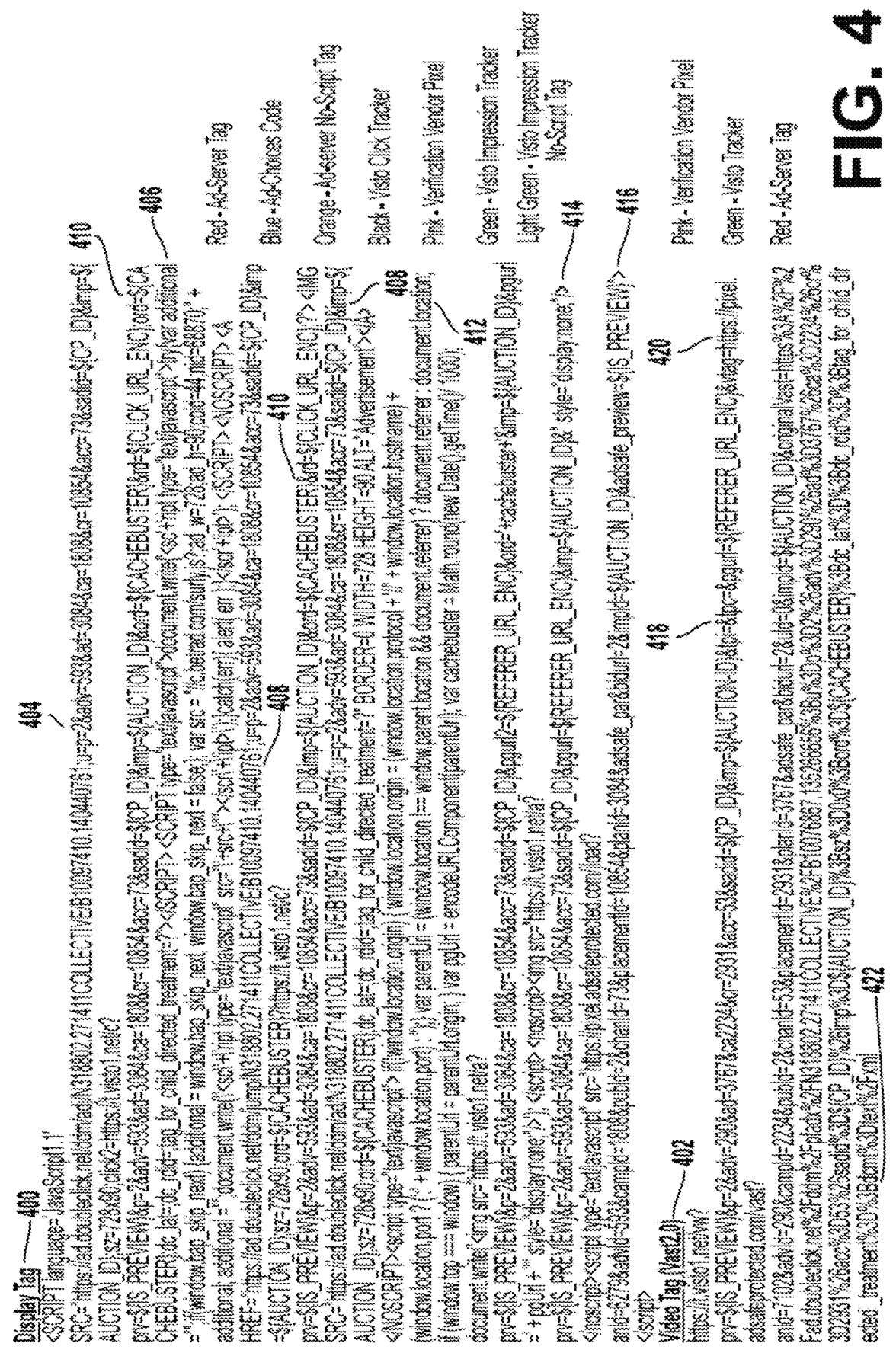

FIG. 4 illustrates example tags which can be applied while implementing the system for aggregating event level data according to various embodiments. Tags can be used to track/identify datasets in third party systems, such as event and/or impression level data. In one embodiment, one or more specialized tag(s) can be applied to leverage functionality of existing ad servers, to provide the ability to incorporate reporting benefits offered by adding tracking URLs from multiple third party systems (vendors) involved in the ad delivery and management process (ad servers, measurement partners, etc.). In this regard, the system is able to generate a unified reporting experience (i.e., the discrepancy report) that combines the authoritative ad server data with quality information provided by a verification/measurement provider, real-time feedback provided by a tracking module, and information obtained from other third party systems participating in the digital media campaign (such as an execution partner). In one embodiment, tags are customized to produce a combination of URLs, custom parameters, and macros for each possible group of vendors leveraged on a campaign.

For example, a display tag 400 and a video tag 402 can be applied by the disclosed system. The display tag 400 and video tag 402 demonstrate various parameters and URLs/trackers that can be assembled using the techniques described herein. The code 404 and 408 under the display tag 400, references the original ad tag provided by the ad server. The code 412 and code 414 under the display tag 400 references the impression tracking mechanism from the tracker. The code 410 under the display tag 400 references the click-tracking mechanism from the tracker. The codes 412, 414, and 410 can be added automatically during the tag assembly process. The code 416 under the display tag 400 references optional tracking mechanisms for verification or ad quality measurement vendors for the purpose of tracking and comparing impression management. The code 406 under the display tag 400 references ad-choices code.

The code 418 under the video tag 402 references a tracking mechanism from the tracker. The code 420 under the video tag 402 references optional tracking mechanisms for verification or ad quality measurement vendors for the purpose of tracking and comparing impression management. The code 422 under the video tag 402 references the original ad tag provided by the ad server. One skilled in the art will recognize that these are merely examples, and that other types of tags can be used, provided, and/or applied.

Data from the respective third party systems (vendors), such as impression and click counts, viewable and measurable impression counts, etc., can be combined with the metadata such as campaign ID, line ID, ad ID and creative ID, that has been stored about campaigns in the metadata database (e.g., metadata database 135 as shown in FIGS. 1-2). Information on each third party system which is applied to each impression can be stored. Data associated with each third party system involved in a campaign (i.e., a digital media campaign) that needs to be applied on an impression can also be stored. The combination of each creative and ad is stored. This data is surfaced and made available within the discrepancy report (for example, as part of a pre-built "Performance Report"). A discrepancy calculation is automatically applied to the data to make it readily available to users.

In some ideal embodiments, inputs are provided from a plurality of structures. For example, there structures can be in tables such as a total population table with the records including a total number of records seen for that zip code for the data type. Ideally, the system indicates how many devices are in any given zip code. It should be appreciated that the zip code can be identified by any means known or developed including latitude-longitude mapping, geolocation, gps, geoIP, self reported, and the like. For example, a data input stream may supply a latitude and longitude mapping along with raw transactional data.

The transaction data is further used by the system to create identity graphs for consumers. It should be appreciated that consumers may be mapped at the individual, household, device, or any other level. The system maps geographic location along with a consumer's other associated information including transactions, browsing, self-entered, and anything other information that can be mapped to a consumer's identity graph.

Using neural networks, the system creates models around consumer browsing behaviors to identify individuals are intending to perform certain actions. It should, be appreciated that these actions can include determining whether a consumer is interested in learning more information about a subject, making a purchase from a particular brand or of a particular type, or any other likewise metric.

For example, neural networks could be used to determine if a consumer is looking to get into a new fitness regime and in need of athletic apparel, running shoes, weights, an exercise mat, and the like. A fitness apparel marketer would be able to identify individuals, including their likely geographic location, who are intending to make an appropriate purchase.

In various embodiments, intender consumers (i.e., consumers having an intent to buy a particular product, visit a store, shop for a particular type of service, or perform another particular action) can be mapped based on their geographic location. Following with the aforementioned example, those intending to purchase fitness apparel can be geographically mapped to show geographic concentrations of intender consumers.

Figure 5:
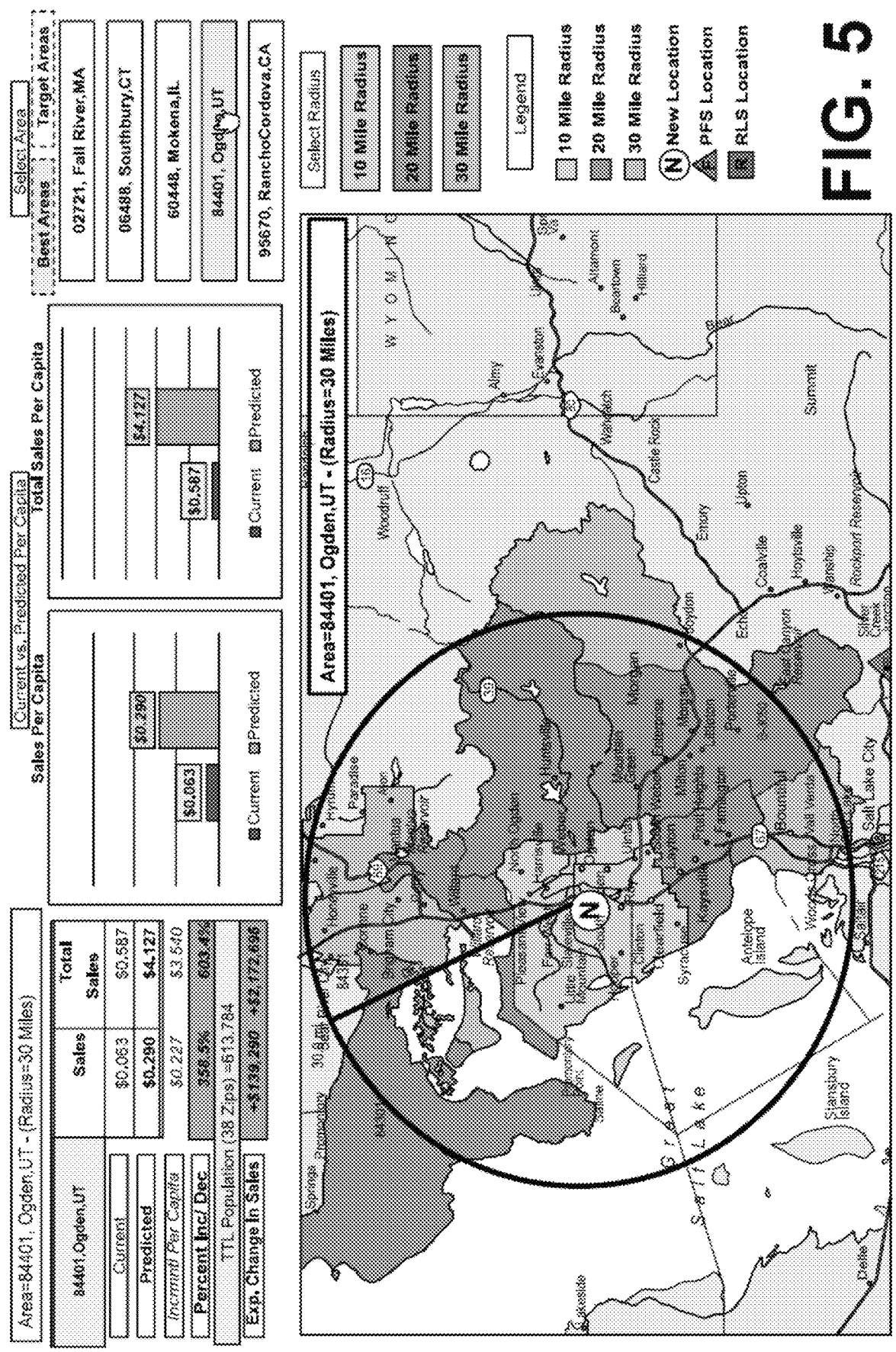
FIG. 5 illustrates an exemplary Graphical User Interface (GUI), according to various embodiments of the present disclosure.

In various embodiments, the intender consumers may be graphically shown illustrating the concentrations. The physical store locations of a particular brand can be overlayed with the intender consumer concentrations to determine an ideal mapping of stores and/or determine whether physical stores are performing in accordance with the expected metrics for the proximate intender audience. For example, the expected sales for a particular area (e.g., a location within a determined radius (10 miles, 20 miles, 30 miles, etc.) of an existing or proposed new location) may be determined by extrapolating per capita sales for a particular brand (e.g., the fitness apparel company) using the total population within the determined radius. The per capita sales may be determined for a total population within a given market (e.g., the total population of the United States). The extrapolated per capita sales may also be determined for different segments of the market including, for example, per capita sales for intender consumers, per capita sales for consumers within a particular demographic (e.g., women between 25-35, consumers having an annual income over $100,000, homeowners, and the like), per capita sales for consumers within a defined proximity to a brand location, and the like. FIG. 5 is a GUI illustrating an example map showing intender consumer concentrations overlaid with proposed store locations. The GUI also illustrates example per capita and expected sales for a new store at the location shown predicted by the system.

Following with the aforementioned example, the fitness apparel company can use the of intender consumer concentrations overlaid over current and or proposed physical store locations to determine how far intender consumers travel to visit their physical stores. Using the distance between intender consumers and current brick and mortar locations, maps of underserved intender consumers, and expected sales for current and new locations for a given proximate audience of intender consumers, the system can suggest locations to open new stores and identify locations that overserved. The GUI may display the overlaid maps for multiple key locations along with a report of key performance indicators (KPIs) including expected and/or actual sales for each location to provide a rapid comparison of the key locations.

In various embodiments, the system for providing real time values may generate models that predict revenue at a particular store location based on the store visitation and the concertation of intender consumers within a radius surrounding the store. The store visitation data may be used to determine the consumers that are visiting the store. The generated models may compare the number of visiting consumers and the sales per consumer to the number of expected visiting consumers and the expected sales based on the intender consumer concertation proximate to location and the expected sales per intender consumer. Output from the generated models may be used to predict how much revenue the company could be getting at locations proximate to a given audience of intender consumers. Underperforming locations identified by the models (e.g., locations having actual sales lower than expected sales or actual visits lower than expected visits) may be an indication that more advertising spend is required to develop the opportunity in a particular area or an indication that the location is not effective and could be closed. Overperforming locations identified by the models (e.g., locations having actual sales higher than expected sales or actual visits higher than expected visits) may be an indication that more locations should be opened within a particular radius or that more advertising spend is required to continue to grow demand and maximize per capita sales for the consumers within the particular radius.

Using input signals including transactional data, audience intender segments, location data, competitive share, and local trends, the system can generate an effective mix of third-party and internal sources that capture additional variance. The system incorporates one or more of these additional data signals into to the models for predicting revenue and/or expected store visitation to improve the ranking and precision of the models. The additional data signals may also be used to generate models that predict the best way to improve one or more KPIs (e.g., sales, sales per consumer, return on advertising spend, store visits, ad impressions, and the like) for intender consumers within a given location. For example, machine learning models may be trained on ad impression data and transactional data for intender consumers to understand the advertising channels that best target the intender consumers. Outputs from these models may be used to allocate additional advertising spend that approved in order to improve the performance of an underperforming store identified by the expected revenue and visitation models. For example, the targeting model may determine intender consumers within a particular radius respond best to ad content displayed in a placement provided by a streaming service (e.g., YouTube) on a connected TV device (e.g., an Apple TV). Accordingly, most of the additional advertising spend may be allocated to bidding on placements in available inventory provided by streaming services and are accessible within the particular geographic radius.

The system can also include dynamic elements in the modeling process to create a solution that is time-sensitive (e.g., may be updated in real time, i.e., several times per second) to evolve with changing situations. For example, the concentrations of intender consumers within a given radius may updated frequently (i.e., daily) or in real time to enable the models to accurately account for consumers that are on vacation of move.

In various embodiments, the system determines how physical stores should be performing based on the potential consumers (i.e., intender consumers) within their geographic locations (i.e., given radius). The system can use that information to determine whether a store is performing as it should given the concentration and demographics of the users in geographic proximity.

The system can also curate targeted content and adjust bids/valuation of advertising inventory taking into account the physical location of the intender consumers and available inventory within the physical location in order to adjust advertising spend to improve in-store sales or other KPIs. The system may also be used to adjust down advertising spend in geographic areas with underperforming physical stores to effectively target intender consumers in other locations. The system may also adjust the allocation of cross channel media spend to present targeted content to consumers within the geographic radius at their preferred channels (e.g., email, web page display ads, connected tv, mobile ads, and the like).

The system may run back tests against historic data to ensure the system is operating successfully and improving the target KPIs. For example, if a user wanted to improve performance at an underperforming physical store, the system could direct additional value (and higher bid price) to advertising inventory accessible to users determined to be an intended consumer of the brand who are in geographic proximity to the underperforming store. More advertisements may be directed to these intender consumers over time in order to increase the likelihood the intender consumers will visit the store and buy products sold at the store. The system can then test the performance of the directed advertisements over time by determining if the intender consumers are engaging with the directed advertisements and whether that engagement is generating an increase in sales, store visits, or any other KPIs.

Users of the system may also want to direct advertisements to intender consumers located in a successfully performing geographic location to increase the visitation to successful stores and the per capita spend of the intender consumers within the high performing location. The brand may use the models described above to determine the overperforming stores and prioritize advertisements to intender consumers who are in geographic proximity to an overperforming store. The system can back test over time to determine if the additional advertising spend increased one or more KPIs for the overperforming store. If the additional advertising was shown in increase sales of other KPIs, the system may suggest the company expand the overperforming store, add additional locations proximate to the overperforming store, or recommend one or more modifications that could be made to other locations to make those stores more similar to the overperforming store.

Figure 6:
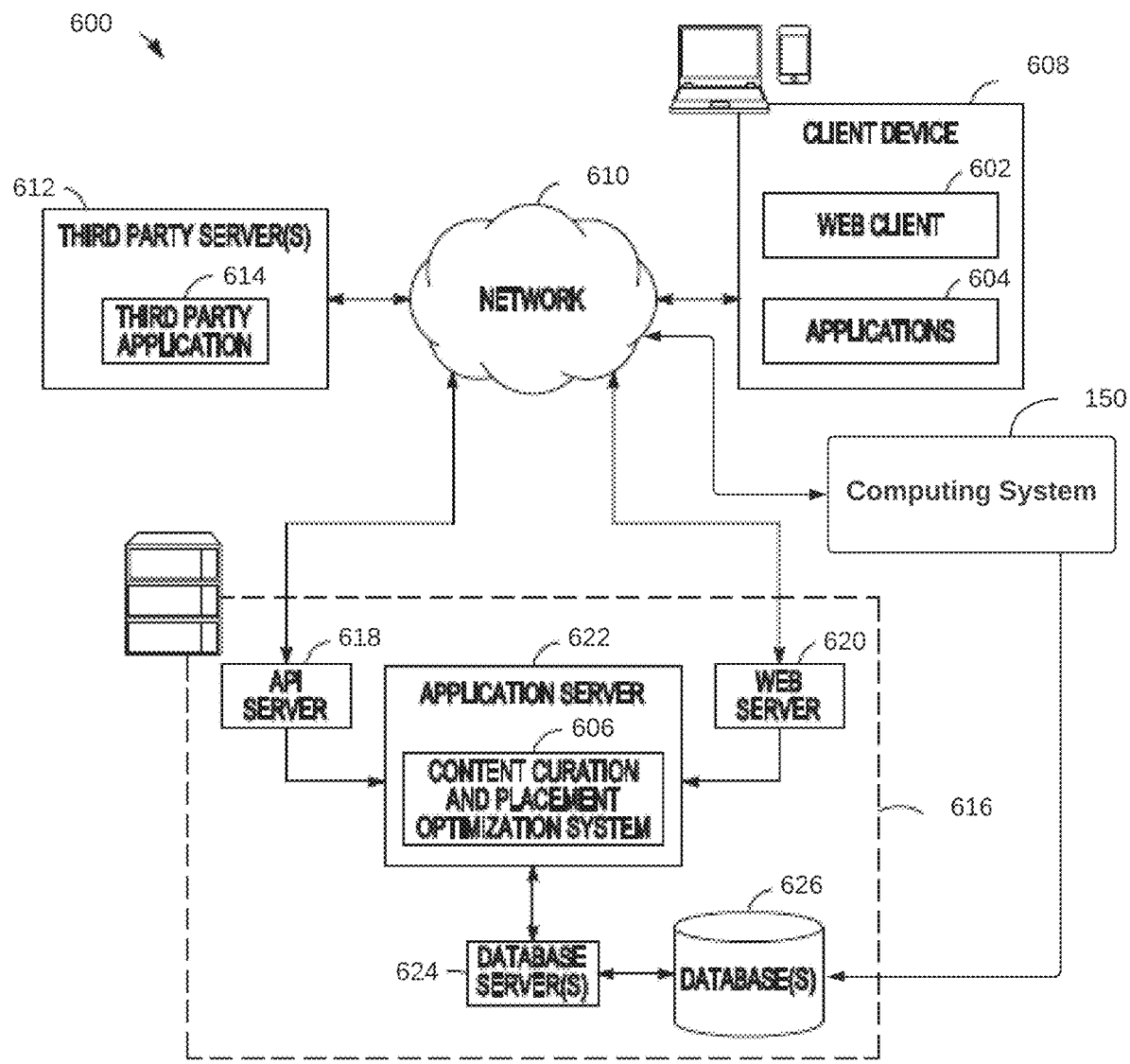
FIG. 6 is a block diagram illustrating a high-level network architecture for curating and optimizing targeted content based on geographic event level data, according to various embodiments of the present disclosure.

With reference to FIG. 6, an example embodiment of a high-level SaaS network architecture 600 is shown. A networked system 616 provides server-side functionality via a publication network 610 (e.g., the Internet or a WAN) to a client device 608. A web client 602 and a programmatic client, in the example form of an application 604, are hosted and execute on the client device 608. The networked system 616 includes an application server 622, which in turn hosts a targeted content curation and placement optimization system 606 for selecting or curating targeted content, and performing targeted content placement optimization, according to one embodiment. The content curation and placement optimization system 606 provides a number of functions and services to the application 604 that accesses the networked system 616. The application 604 also provides a number of interfaces described herein which facilitate, for example, the presentation of a survey to a user of the client device 608 (e.g., an online consumer seeking actionable content on the publication network 610), and responses thereto.

The client device 608 enables a user to access and interact with the networked system 616. For instance, the user provides input (e.g., touch screen input or alphanumeric input) to the client device 608, and the input is communicated to the networked system 616 via the network 610. In this instance, the networked system 616, in response to receiving the input from the user, communicates information back to the client device 608 via the network 610 to be presented to the user.

An Application Program Interface (API) server 618 and a web server 620 are coupled, and provide programmatic and web interfaces respectively, to the application server 622. The application server 622 hosts the content curation and placement optimization system 606, which includes components or applications. The application server 622 is, in turn, shown to be coupled to a database server 624 that facilitates access to information storage repositories or inventories (e.g., a database 626). In an example embodiment, the database 626 includes storage devices that store information accessed and generated by the content curation and placement optimization system 606.

Additionally, a third-party application 614, executing on a third-party server(s) 612, is shown as having programmatic access to the networked system 616 via the programmatic interface provided by the API server 618. For example, the third-party application 614, using information retrieved from the networked system 616, may support one or more features or functions on a website hosted by a third party.

Input from the user may be stored in a data cloud or other database. For example, displays, impressions, clicks, survey responses or other input received from the client device 608 may be used to generate impression data indicating the user is engaged with a survey or other targeted content displayed on the client device 608. The survey responses input by the user may be analyzed to extract consumer data (e.g., a piece demographic data for the user, a piece of financial data (e.g., income, credit score, and the like) for the user, one or more interests or the user, products or services the user has expressed an intent to purchase, brands the user favors or dislikes, and the like.)

The real-time event level tracking system described in FIGS. 1-4 may capture impression data including displays, impressions, clicks, conversions including purchases and other transactions, and other engagement of users with targeted content. The real-time event level tracking system may be implemented using the computer system 150 described in FIG. 1 and may interface with the networked system via and API executed by the API server 618. The real-time event level tracking system may also transmit impression data, consumer data, and/or consumer attributes, prediction models and other data derived from the impression data and consumer data to the networked system by storing the consumer data, impression data, and derived data in a data cloud or other database 626 hosted by the database servers 624. The real-time event level tracking system may also be a component of the networked system 616 and may, for example, be implemented as an application hosted by the application server 622.

In various embodiments, one or more components of the networked system 616 may derive the impression data and or the consumer data from the user inputs and add the impression data and or consumer data to a consumer identity profile associated with the user. The input from the user received by the web server 620 may also be transmitted to the application server 622 and/or the API server 618 for analysis. One or more components of the content curation and placement optimization system 606 and/or programmatic functions of an application programing interface (API) executed by the API server 618 may generate the consumer data and/or impression data based on the user inputs. The consumer data and/or impression data may then be transmitted to the database servers 624 and/or third party servers 612 to enrich the consumer identities of users engaging with the survey or other targeted content by updating the relevant consumer identities based on the consumer data and or impression data. As described in more detail below in FIG. 7, the enriched consumer identities may enhance the networked system's knowledge of each individual user that engages with the survey or other targeted content. One or more components of the content curation and placement system 606 may use the consumer data, impression data, and or enriched consumer identities to curate content, facilitate the exchange of ad inventory, and optimize content placement.

Turning now specifically to the applications hosted by the client device 608, the web client 602 may access the various systems (e.g., content curation and placement optimization system 606) via the web interface supported by the web server 620. Similarly, the application 604 (e.g., an "app") accesses the various services and functions provided by the content curation and placement optimization system 606 via the programmatic interface provided by the API server 618. The application 604 may be, for example, an "app" executing on the client device 608, such as an IOS™ or ANDROID™ OS application to enable a user to access and input data on the networked system 616 in an offline manner, and to perform batch-mode communications between the application 604 and the networked system 616.

Further, while the SaaS network architecture 600 shown in FIG. 6 employs a client-server architecture, the present subject matter is not necessarily limited to such an architecture and could equally-well find application in a distributed, or peer-to-peer, architecture system, for example. The content curation and placement optimization system 606 could also be implemented as a standalone software program, which does not necessarily have networking capabilities.

Figure 7:
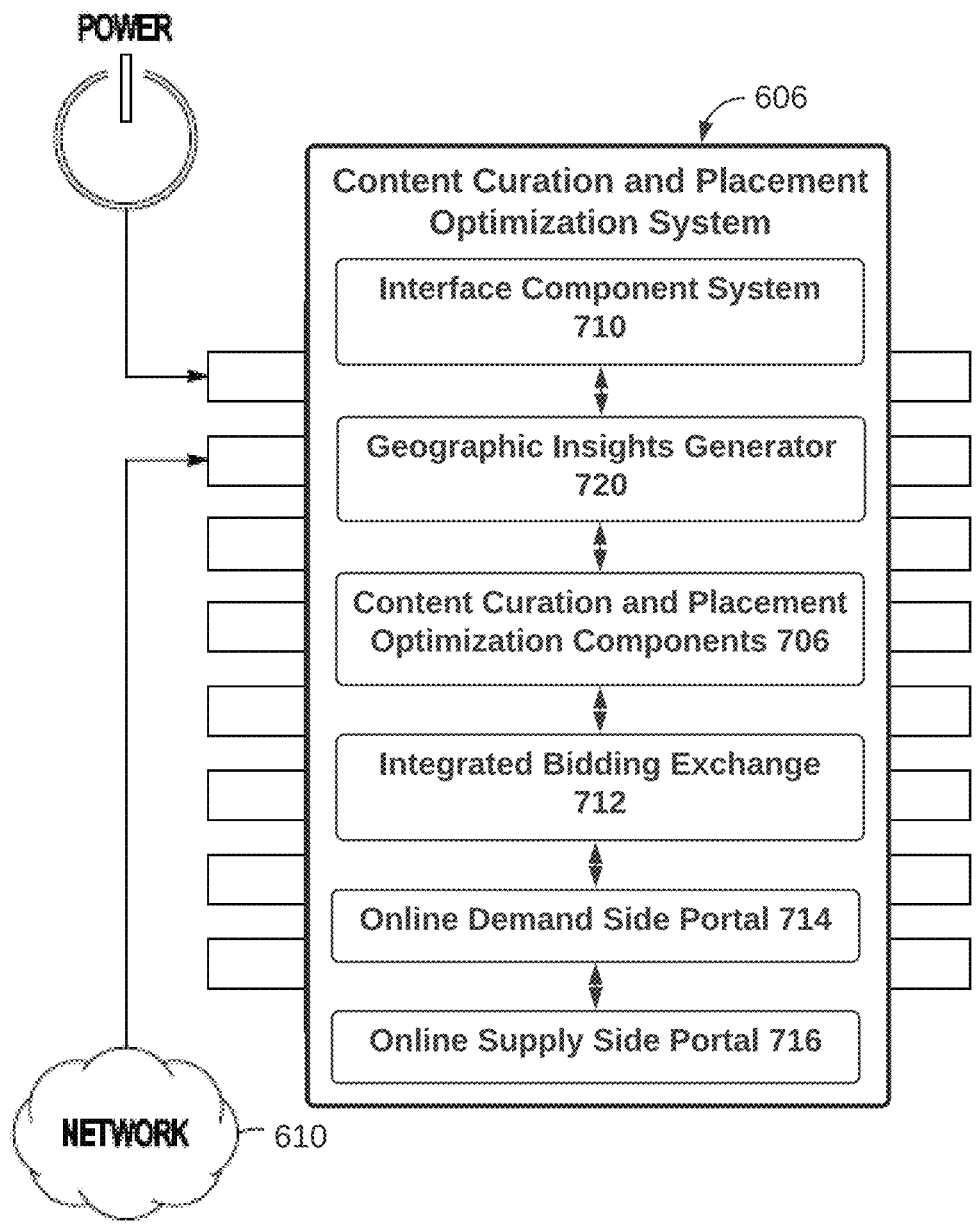
FIG. 7 is a block diagram showing architectural aspects of a targeted content curation and placement optimization system, according to various embodiments of the present disclosure.

FIG. 7 is a block diagram showing architectural details of a targeted content curation and placement optimization system 606, according to some example embodiments. Specifically, the content curation and placement optimization system 606 is shown to include an interface component system 710 by which the content curation and placement optimization system 606 communicates (e.g., over a publication network 610) with other systems within the SaaS network architecture 600.

The interface component system 710 is collectively coupled to one or more content curation and placement optimization components 706 that operate to provide specific aspects of selecting or curating targeted content, and performing targeted content placement optimization, in accordance with the methods described further below with reference to the accompanying drawings. The content curation and placement optimization components 706 are coupled to a geographic insights generator 720 that provides geo-specific intender attributes to facilitate the content curation and content placement processes.

The targeted content curation and placement optimization system 606 includes an integrated bidding exchange 712, an online demand side portal 714 accessible to a targeted content provider, and an online supply side portal 716 accessible to a publisher of content on the publication network 708. The bidding exchange 712 is communicatively coupled to the demand side portal 714 and the supply side portal 716 to present user interfaces enabling receipt of bids from a content provider for placement of content by a publisher at a specified location or domain in available inventory on the publication network 610. The content curation and placement optimization components 706 are configured to reserve, upon receipt of a successful bid from the content provider, the specified location or domain for placement of targeted content to a user. A user may include a user as described above, for example an online consumer seeking actionable content or guidance on the publication network 610.

It should be understood that the targeted content curation and placement optimization system 606 may include one or more instances of each of the content curation and placement optimization components 706. For example, the targeted content curation and placement optimization system 606 may include multiple instances of the demand side portal 714 and multiple instances of the supply side portal 716 with each instance being operated by a different targeted content provider and different content publisher respectively. It should also be understood that the process for bidding for placement of content at a specified location or domain and the process for providing the targeted content for display may be partially or completely programmatic. For example, a demand side API or other logic included in the online demand side portal 714 may programmatically bid on the placement of content and provide targeted content in response to providing a winning bid based on one or more parameters set by the targeted content provider and or the targeted content curation and placement optimization system 606. The demand side API may also programmatically analyze impression data, consumer data, enriched consumer identities, or other data presented in the demand side portal 714 to dynamically adjust bids for the placement of content in real time (e.g., at a speed of multiple times per second or faster) according to one or more parameters set by the targeted content provider and or the targeted content curation and placement optimization system 606.

Similarly, a supply side API or other logic included in the supply side portal 716 to programmatically determine available inventory at a specified location or domain, provide the available inventory to the integrated bidding exchange 712, price the available inventory, and place targeted content within one or more reserved placements in a digital publication based on one or more parameters set by the content publisher and or the targeted content curation and placement optimization system 606. The supply side API may also programmatically analyze impression data, consumer data, enriched consumer identities, or other data presented in the supply side portal 716 to adjust the amount or price of available inventory or identify particular content providers that may be interested in a particular piece of available inventory according to one or more parameters set by the content publisher and or the targeted content curation and placement optimization system 606. Each function of the supply side API and or demand side API may occur automatically in real time in order to support a large volume (e.g., hundreds per second or more) of bids for the placement of content, purchases of available inventory, and displays of targeted content.

In some examples, the content curation and placement optimization components 706 are further configured to present a user interface, to the consumer, at the reserved specified location or domain. The user interface may include a survey soliciting feedback from the consumer on a content topic of interest (e.g., the consumer's interests or shopping characteristics, the desired actionable content, or other guidance) that is presented to the consumer at the specified location or domain on the publication network. Displays, impressions, clicks, survey responses, and other interactions with the survey or other targeted actionable content may be recorded as impression data by the content curation and placement optimization system 606. Survey responses input in the user interface by the consumer may also be recorded and analyzed by the content curation and placement optimization system 606 to generate consumer data. The impression data and or consumer data may be used by the content curation and placement optimization components 706 to select or curate, based on the survey responses, targeted content to be presented to the consumer at the specified location or domain on the publication network.

In various embodiments, the impression data and/or consumer data may be used to enrich a consumer identity profile stored in a data cloud or other database 626 accessible by the networked system 616. For example, the real-time event level tracking system may capture impression data for one or more campaigns orchestrated by the content curation and placement optimization system. To run the campaigns, the content curation and placement optimization system may select a piece of targeted content and, in response to submitting a successful bid for a placement in available digital advertising inventory, reserve the placement and provide the selected content to the publisher for display at a specific location of domain on the publication network including the reserved placement. The system for aggregating event level data or other component of the networked system, may collect impression data capturing engagement of the consumers with the targeted content. The impression data may also include metadata used to identify the consumer interacting with the targeted content. For example, the identification metadata may include one or more unique identifiers (e.g., email address, IP address, device identifier, and the like) associated with a consumer.

The system for aggregating event level may resolve an identity and geographic location for each of the consumers based on the one or more datasets stored in the data cloud. In various embodiments, the identity and geographic location for each consumer may be resolved by matching one or more pieces of identification metadata with known identifiers for the consumer included in a consumer attributes profile stored in an identity graph, data cloud, or other database. The consumer attributes profile may include location data (e.g., a zip code, street address, or other known geographic location for the consumer) and one or more intender attributes. The intender attributes may include individual metrics that may be used to determine an intent of a consumer to purchase a product, visit a store, view an ad, or perform another action. For example, the intender attributes may include demographic information and other consumer data as well as individual level brand propensities (e.g., a tendency of the consumer to shop at store of a particular brand, purchase a particular brand of athletic shoes or other goods, consume content on YouTube or another particular media publisher by a particular band, and the like), brand affinity scores (e.g., metrics that describe how frequency and/or consistently consumers engage with particular brands, for example, how often consumers purchase products made by the brand, click or view ad or emails send by the brand, visit particular brand website, and the like), product propensities (e.g., the types of products or services consumers frequently and/or consistently buy or show interest in), and the like. The intender attributes may also include semantic codes (e.g., key words or important terms) summarizing the content of web pages and other digital media browsed by consumers. The intender attributes may also include an attitude or behavioral propensity (e.g., materialistic, athletic, health conscious, frugal, aggressive, or other personality trait) or a channel propensity (e.g., email, web page display, mobile ad, connected tv media, or other marketing channel preferred by a consumer).

The intender attributes and the geographic locations for the consumers may be extracted from the consumers attribute profiles and provided to the geographic insights generator 720. In various embodiments, the geographic insights generator may identify the geographic location for each of the consumers and group the consumers by geographic location. The geographic insights generator 720 may then determine geo-specific intender attributes for consumers located within one or more pre-selected locations. To determine the geo-specific intender attributes, the geographic insights generator 720 may define a geofence around the pre-selected location and select consumers having geographic location within the geofence boundaries. For example, San Francisco, CA and a geofence having a 10 mile radius may be input into the geographic insights generator 720 as the pre-selected location of interest and geofence boundaries. The geographic insights generator may determine the intender attributes for each of the consumers having a geographic location within a 10 miles radius of San Francisco to draw insights about the consumers living the San Francisco, CA and the immediate surrounding area.

Once, consumers for the location of interest have been indented and their intender attributes retrieved, the geographic insights generator 720 may determine one or more geo-specific intender attributes by comparing the intender attributes for the consumers located within the selected geographic radius against the intender attributes for a sample of consumers having multiple geographic locations outside the selected geographic radius. For example, the intender attributes for the consumers within the location of interest may be compared to the intender attributes for a sample of consumers having locations within a random selection of zip codes or other geographic locations. The intender attributes compared may be specific to a particular brand or type of goods. For example, a sample of intender attributes related to athletic shoes (e.g., brand affinities for Nike and other athletic appeal brands, product propensities for shoes and athletic clothing, sports related semantic codes, and the like) may be compared to identify geo-specific intender attributes for consumers within the location of interest that are likely interested in athletic shoes. The sample of consumers compared may also be filtered by demographic, age, financial situation, or other piece of consumer data to derive geo-specific intender attributes for consumers have a particular characteristic (e.g., females 25-35, homeowners, individuals having an annual income of at least $75,000, and the like). The geographic insights generator may also compare all of the intender attributes for each consumer in order to determine the most prevalent geo-specific intender attributes across the entire population of the area of interest.

In various embodiments, the geographic insights generator may compare the intender attributes of consumers within the area of interest to the intender attributes of consumers generally by determining a difference between the intender attributes for the population of consumers within the area of interest and the intender attributes of the population of consumers selected from random locations. For example, the geographic insights generator may calculate a percent difference between metrics within consumer data for the different populations (e.g., percent female, total population, average age, average income, percent college graduates, percent homeowner, percent Asian or other race or ethnicity, and the like). The geographic insights generator 720 may also determine an absolute difference or scaled difference between two or more scores for brand propensities, product propensities, brand affinities, sematic codes, or other signals metrics. The percent difference and/or absolute or scaled difference may be compared to a pre-determined difference threshold to identify the intender attributes of the consumers from the location of interest that are statistically and/or significantly different from the intender attributes of consumers as whole. The geographic insights generator 720 may also select a pre-determined number of the intender attributes having the largest difference between the different populations of consumers (e.g., the 5 or 10 intender attributes that are the most different for the population of consumers within the area of interest) as the geo-specific intender attributes.

The interface component system 710 may provide geo-specific intender attributes from the geographic insights generator 720 along with impression data, consumer data, and/or enriched consumer identities to the demand side portal 214 so that a targeted content provider may better understand the users within the area of interest. For example, the geo-specific intender attributes may identify particular brands, products, types of content, and marketing channels that resonate most with the consumers in the area of interest. The targeted content provider may access the bid exchange 712 through the demand side portal 714 to bid and/or update a previous bid for placement of content by the publisher at a specified location or domain in available inventory based on the geo-specific intender attributes, impression data, consumer data, and/or enriched consumer identities. The content curation and placement optimization components 706 may also programmatically bid and/or update bid values based on the geo-specific intender attributes, impression data, consumer data, and/or enriched consumer identities. In various embodiments, the content curation and placement optimization components 706 may update bid parameters for a user of the demand side portal 714 to bid on more and/or increase bid amounts for placements accessible within the area of interest, associated with web pages frequently visited by consumers in the area of interest based on the geo-specific intender attributes and other data for the consumers within the area of interest. For example, in response to geo-specific intender attributes indicating a strong product propensity for athletic shoes among women ages 25-35 in the area of interest, the content curation and placement optimization components 706 may change the bid parameters for an athletic appeal brand to increase the bid value for placements and bid or more placements for targeted content in domains that are frequently visited by women ages 25-35 that live in the area of interest.

In various embodiments, the geographic insights generator 720 may back test the performance of the targeted content at any additional placements reserved as a result of the modified bid parameters by comparing the impression data and sales for the period after the bid parameters were modified to historical impression data and sales for a prior period with the original bid parameters. The geographic insights generator 720 may then update the geo-specific intender attributes and/or determine new geo-specific intender attributes based on the back test results. For example, the geographic insights generator 720 may remove the athletic shoe product propensity for the geo-specific attributes if the additional ad placements did not increase impressions, sales, or one or more other KPIs.

The targeted content curation and placement optimization system 706 may also generate and/or select targeted content based on the geo-specific intender attributes impression data, consumer data, and or enriched consumer identities. For example, the targeted content curation and placement optimization system 706 may select target content with a sports theme (e.g., a piece of advertising including an endorsement from a famous athlete) in response to geo-specific intender attributes indicating consumers in the area of interest have a tendency to browse web pages and other media have sports or athletic content (i.e., the geo-specific intender attributes include a sports semantic code). In various embodiments, the geographic insights generator 720 may back test the performance of the targeted content selected based on the geo-specific intender attributes by comparing the impression data and sales (e.g., click through sales, in store sales at locations within the location of interest, and the like) generated by the sports themed targeted content against the historical impression data and sales generated previous targeted content. The geographic insights generator 720 may then update the geo-specific intender attributes and/or determine new geo-specific intender attributes based on the back test results. For example, the geographic insights generator 720 may remove the sports semantic code for the geo-specific attributes if the sports themed targeted content did not increase impressions, sales, or one or more other KPIs.

The interface component system 710 may also provide the geo-specific intender attributes, impression data, consumer data, and or enriched consumer identities to the supply side portal 716 to give the publisher of content more insight into the targeted content providers that may wish to communicate with consumers within a location of interest. For example, the supply side portal 716 may identify a group of content providers (i.e., athletic brands) that are more likely to targeting users in a location of interest based on geo-specific attributes indicating a product propensity for athletic clothing among the consumers in the area of interest. The supply side portal 716 may then send offers for placements at particular domain accessible and/or population within the area of interest to an instance of the demand side portal 714 operated by one or more of the group identified content providers. In some examples, the content curation and placement optimization components 706 are further configured to present the targeted content to the consumer at the specified location or domain on the publication network. In some examples, the content curation and placement optimization components 706 are further configured to process a transaction between the content provider and the publisher based on the presentation or a viewing of the targeted content by the consumer, or a third party.

Figure 8:
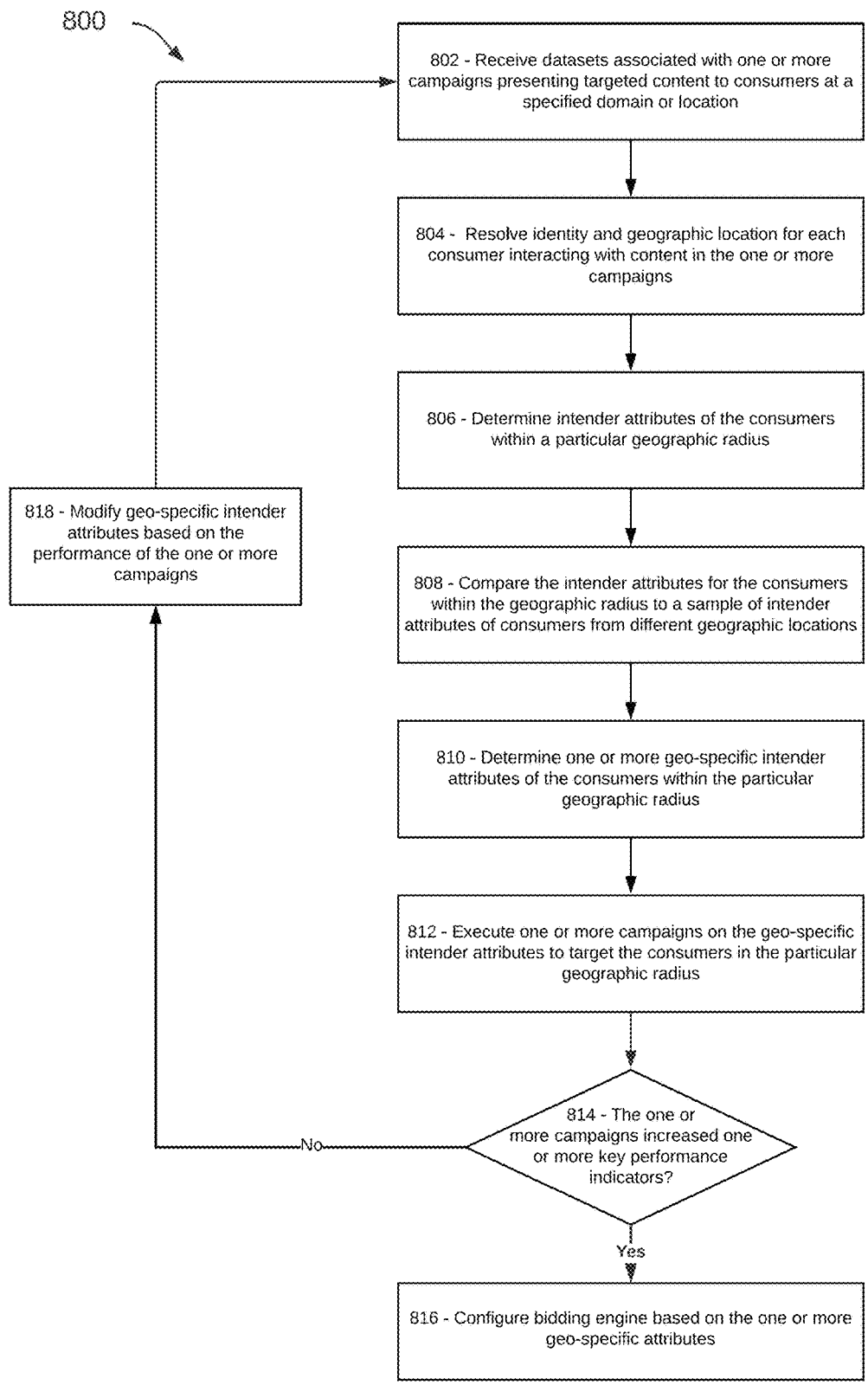
FIG. 8 is a flow chart depicting operations in a method, according to various embodiments of the present disclosure.

FIG. 8 is a block diagram illustrating an example process 800 for generating and using geo-specific intender attributes. At 802, the targeted content placement and optimization system receives datasets associated with one or more campaigns presenting targeted content to consumers at a specified domain or location. At 804, the identity and geographic location for each consumer interacting with content in the one or more campaigns is resolved by matching an identifier for each consumer with an identify profile stored in an identity graph, data cloud, or other database. At 806, the intender attributes of the consumers within a particular geographic radius are determined by identifying the consumers having a location within a defined geographic radius and extracting the intender attributes for the identified consumers from their identity profiles.

At 808, the intender attributes for the consumers within the geographic radius are compared to a sample of intender attributes of consumers from different geographic locations. At 810, one or more geo-specific intender attributes of the consumers within the particular geographic radius are determined based on the comparison. For example, the geo-specific intender attributes that are more prevent (i.e., meet or exceed a pre-defined difference threshold) for the consumers within the particular geographic radius relative to the sample of consumers from multiple different locations (i.e., consumers generally) may be identified as geo-specific intender attributes.

At 812 one or more campaigns on the geo-specific intender attributes are executed to target the consumers in the particular geographic radius. For example, a campaign presenting targeted content selected and or placed based on the geo-specific intender attributes may run at specific locations or domains accessible within the particular geographic radius. At 814, the performance of the one or more campaigns is evaluated be determining the impact of the one or more campaigns on one or more KPIs. If the one or more campaigns increase at least one of the one or more KPIs, (yes at 814) a bidding engine (e.g., an online demand side portal interacting with an integrated bidding exchange) may be configured based on the one or more attributes, at 816. For example, the bidding engine may be programed to continue to purchase/purchase more placements accessible in the particular geographic radius and/or provide content for the placements that is curated to target a product propensity, brand affinity, demographic, semantic code, or other the geo-specific intender attribute. If the one or more campaigns do not increase the one or more KPIs (i.e., decrease the KPIs or result in no change) (no at 814), the geo-specific intender attributes may be modified based on the performance of the one or more campaigns, at 818 by repeating steps 802-810. For example, the geo-specific intender attributes targeted by the unsuccessful campaign may be removed form the list of geo-specific intender attributes for the consumers within the particular geographic radius and/or new geo-specific intender attributes may be determined based on the impression data and other datasets generated during the executed campaigns.

Figure 9:
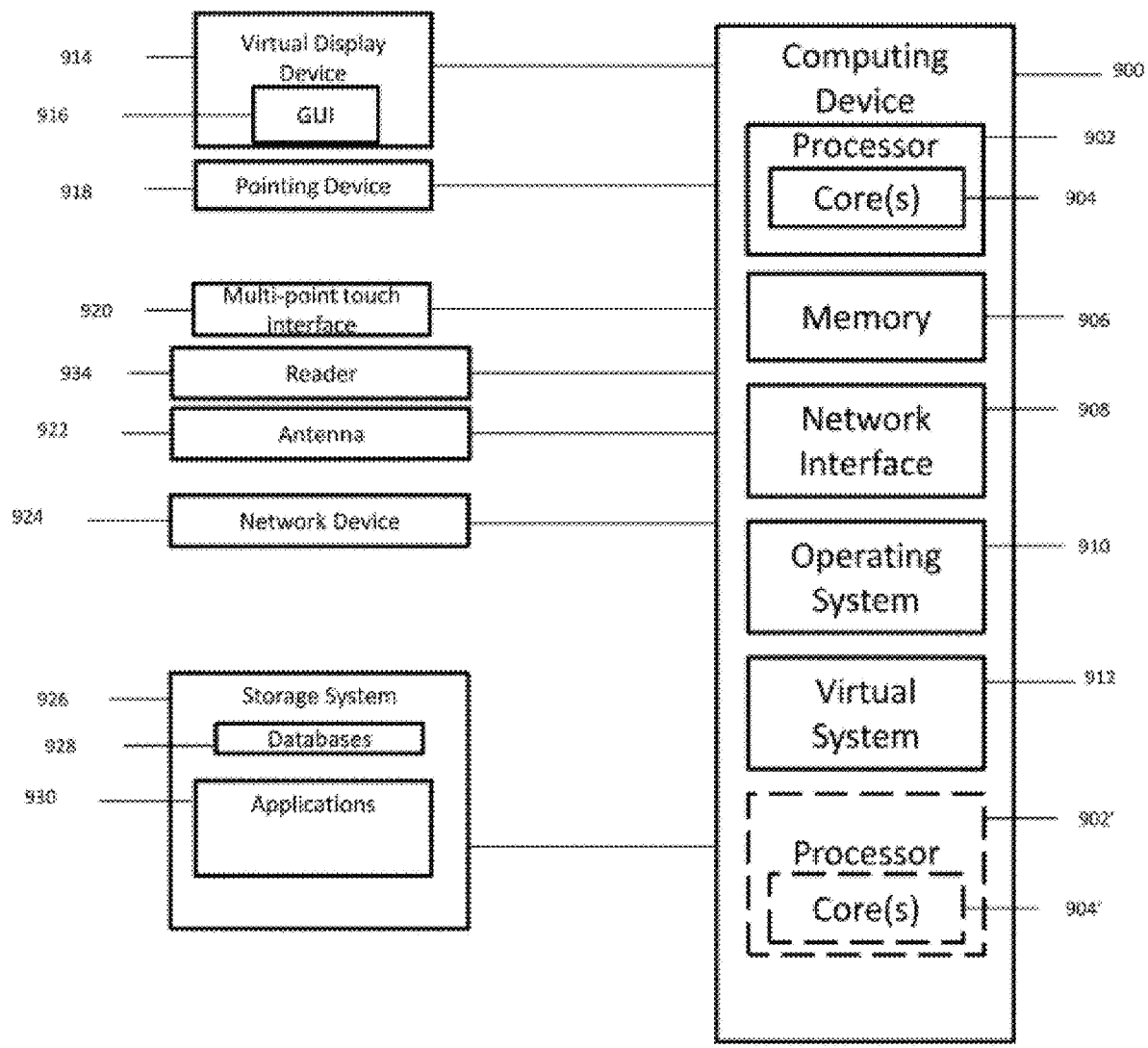
FIG. 9 illustrates a computing device according to various embodiments of the present disclosure.

FIG. 9 is a block diagram of an example computing device for implementing the system for aggregating event level data and/or the targeted content placement and optimization system described above. The computing device 900 may be, but is not limited to, a smart phone, laptop, tablet, desktop computer, server, or network appliance. The computing device 900 can be embodied as part of the computing system, user device and/or third party systems. The computing device 900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 906 included in the computing device 900 may store computer-readable and computer-executable instructions or software (e.g., applications 930 such as the reporting application 155, workflow module 152, API service 154, log ingestion module 156, streaming platform 160, data ingestion module 164, reporting analytics engine 168, and targeted content curation and placement optimization system 606) for implementing exemplary operations of the computing device 900. The computing device 900 also includes configurable and/or programmable processor 902 and associated core(s) 904, and optionally, one or more additional configurable and/or programmable processor(s) 902' and associated core(s) 904' (for example, in the case of computer systems having multiple processors/cores), for executing computer-readable and computer-executable instructions or software stored in the memory 906 and other programs for implementing exemplary embodiments. Processor 902 and processor (s) 902' may each be a single core processor or multiple core (904 and 904') processor. Either or both of processor 902 and processor (s) 902' may be configured to execute one or more of the instructions described in connection with computing device 900.

Virtualization may be employed in the computing device 900 so that infrastructure and resources in the computing device 900 may be shared dynamically. A virtual system 912 may be provided to handle a process running on multiple processors so that the process appears to be using only one computing resource rather than multiple computing resources. Multiple virtual machines may also be used with one processor. Memory 906 may include a computer system memory or random access memory, such as DRAM, SRAM, EDO RAM, and the like. Memory 906 may include other types of memory as well, or combinations thereof.

A user may interact with the computing device 900 through a visual display device 914, such as a computer monitor, which may display one or more graphical user interfaces 916, multi touch interface 920, and a pointing device 918. The computing device 900 may also include one or more storage devices 926, such as a hard-drive, CD-ROM, or other computer readable media, for storing data and computer-readable instructions and/or software that implement exemplary embodiments (e.g., applications). For example, exemplary storage device 926 can include one or more databases 928 for storing data values for metadata, data extracted from third party systems associated to campaigns, visitor attribute data, identify graphs and/or other user information data. The databases may be implemented as a data cloud of other distributed storage service. The databases 928 may be updated manually or automatically at any suitable time to add, delete, and/or update one or more data items in the databases.

The computing device 900 can include a network interface 908 configured to interface via one or more network devices 924 with one or more networks, for example, Local Area Network (LAN), Wide Area Network (WAN) or the Internet through a variety of connections including, but not limited to, standard telephone lines, LAN or WAN links (for example, 802.11, T2, T3, 56 kb, X.25), broadband connections (for example, ISDN, Frame Relay, ATM), wireless connections, controller area network (CAN), or some combination of any or all of the above. In exemplary embodiments, the computing system can include one or more antennas 922 to facilitate wireless communication (e.g., via the network interface) between the computing device 900 and a network and/or between the computing device 900 and other computing devices. The network interface 908 may include a built-in network adapter, network interface card, PCMCIA network card, card bus network adapter, wireless network adapter, USB network adapter, modem, or any other device suitable for interfacing the computing device 900 to any type of network capable of communication and performing the operations described herein.

The computing device 900 may run operating system 910, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 900 and performing the operations described herein. In exemplary embodiments, the operating system 910 may be run in native mode or emulated mode. In an exemplary embodiment, the operating system 910 may be run on one or more cloud machine instances.

In general, "INVENTORY" in this context may be a term for a unit of advertising space, such as a magazine page, television airtime, direct mail message, email messages, text messages, telephone calls, etc. Advertising inventory may be advertisements a publisher has available to sell to an advertiser. In certain embodiments, advertising inventory may refer to a number of email advertisements being bought and/or sold. The terms INVENTORY and ADVERTISING INVENTORY may be used interchangeably. For email marketing campaigns, advertising inventory is typically an email message.

A "PUBLISHER" in this context may be an entity that sells advertising inventory, such as those produced by the systems and methods herein, to their email subscriber database. An advertiser may be a buyer of publisher email inventory. Examples of advertisers may include various retailers. A marketplace may allow advertisers and publishers to buy and sell advertising inventory. Marketplaces, also called exchanges or networks, may be used to sell display, video, and mobile inventory. In certain embodiments, a marketplace place be an email exchange/email marketplace. An email exchange may be a type of marketplace that facilitates buying and/or selling of inventory between advertisers and publishers. This inventory may be characterized based on consumer attributes used in marketing campaigns. Therefore, an email exchange may have inventory that can be queried by each advertiser. This may increase efficiency of advertisers when purchasing inventory. A private network may be a marketplace that has more control and requirements for participation by both advertisers and publishers.

An "AUDIENCE" in this context may be a group of records, which may be purchased as inventory. In certain embodiments, an audience may be a group of records selected from publisher databases of available records such as a group of consumers and their affiliated profiles. The subset of selected records may adhere to a predetermined set of criteria, such as common age range, common shopping habits, and/or similar lifestyle situation (i.e., stay-at-home mother). Advertisers generally select the predetermined set of criteria when they are making an inventory purchase.

"CLIENT DEVICE" in this context refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xTT), Evolution-Data Optimized (EVDO) technology, General Packet Radio Service (GPRS) technology, Enhanced Data rales for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT" in this context refers to a device, a physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein, A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors, It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, in instances where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A targeted content curation and placement optimization system comprising:
   a processor connected to a publication network and a data cloud,
   the data cloud including memory storing multiple identity graphs, the processor configured to:

present targeted content at a specified location on the publication network;

receive, from the publication network, impression data including an engagement action with the targeted content and a piece of identification metadata;

access the memory of the data cloud to retrieve at least one of the identity graphs;

determine an identity profile associated with each engagement action by matching the piece of identification metadata with a known identifier included in a particular identity profile stored in the at least one of the identity graphs;

retrieve the identity profiles associated with each engagement action from the memory of the data cloud;

determine a geographic location for each engagement action by identifying a piece of location data associated with each piece of matched identification metadata, each piece of location data identified from one of the retrieved identity profiles;

receive, via a graphical user interface (GUI), a user selection of a geographic location and a specified radius for a geofence boundary;

define a geofence around the selected location based on the geofence boundary;

access the memory of the data cloud to determine multiple intender attributes for each of the retrieved identity profiles having a geographic location within the geofence;

identify one or more geo-specific intender attributes based on a comparison of the intender attributes for a first population including identity profiles having a location within the geofence and the intender attributes for a second population including a sample of identity profiles having a location outside the geofence;

display, in the GUI, a map and one or more metrics, the map showing a store location at the center of the geofence and a concentration of intender consumers located within the geofence overlaid on the store location, the one or more metrics including a predicted and current amount of sales for the store location, the intender consumers corresponding to identity profiles having the geo-specific intender attributes;

adjust, via the publication network, one or more bid parameters of an online demand side portal based on the concentration of intender customers displayed in the map and a difference between the current and predicted amount of sales shown in the GUI, the adjusted bid parameters increasing a number of placements accessible online within the geofence displayed on the map that receive bids from the demand side portal; and submit, based on the adjusted bid parameters, one or more bids to an online bidding exchange that reserve one or more online placements for targeted content at a specified location on the publication network.

2. The system of claim 1, further comprising: an online supply side portal accessible, via the publication network, to a publisher of content on the publication network;

wherein the online demand side portal is accessible, via the publication network, to a content provider; and the online bidding exchange an integrated bidding exchange communicatively coupled to the demand side portal and the supply side portal, the integrated bidding exchange presenting user interfaces enabling receipt of bids from the content provider for placement of content by the publisher at a specified location on the publication network; and wherein the processor is further configured to reserve the one or more placements of targeted content at the specified location or domain in response to receiving a successful bid from the online demand side portal.

3. The system of claim 1, wherein the processor is further configured to adjust one or more bid parameters of the online demand side portal to modify a bid value for one or more placements accessible online within the geofence based on the one or more geo-specific intender attributes.

4. The system of claim 1, wherein the processor is further configured to adjust an allocation of cross channel media spend within the geofence based on the one or more geo-specific intender attributes.

5. The system of claim 1, wherein the intender attributes include at least one of a piece of demographic data, a piece of financial data, a brand propensity, a brand affinity, an attitude or behavioral propensity, a channel propensity, a product propensity, and a semantic code.

6. The system of claim 1, wherein the processor is further configured to display a piece of targeted content at the one or more reserved placements;

determine a change in one or more key performance indicators (KPIs) based on impression data received for the displayed content; and re-configure one or more of the adjusted bid parameters of the online demand side portal based on the one or more geo-specific intender attributes in response to determining an increase in the one or more KPIs.

7. The system of claim 6, wherein the KPIs include at least one of sales per consumer, return on advertising spend, store visits, and ad impressions.

8. The system of claim 1, wherein the processor is further configured to display a piece of targeted content at the one or more reserved placements;

determine a change in one or more key performance indicators (KPIs) based on impression data received for the displayed content; and modify at least one of the one or more geo-specific intender attributes based on determining a decrease or no change in the one or more KPIs.

9. A method of targeted content curation and placement optimization comprising:

presenting, via a processor connected to a publication network and a data cloud, targeted content at a specified location on the publication network;

receiving, from the publication network, impression data including an engagement action with the targeted content and a piece of identification metadata;

determining an identity profile associated with each engagement action by matching the piece of identification metadata with a known identifier included in a particular identity profile stored in one or more-identity graphs stored in a memory of the data cloud;

retrieving the identity profiles associated with each engagement action from the memory of the data cloud;

determining a geographic location for each engagement action by identifying a piece of location data associated with each piece of matched identification metadata, each piece of location data identified from one of the retrieved identity profiles;

receiving, via a graphical user interface (GUI), a user selection of a geographic location and a specified radius for a geofence boundary;

defining a geofence around the selected location based on the geofence boundary;

accessing a memory of the data cloud to determine multiple intender attributes for each identity profile having a geographic location within the geofence;

identifying one or more geo-specific intender attributes based on a comparison of the intender attributes for a first population including identity profiles having a location within the geofence and the intender attributes for a second population including a sample of identity profiles having a location outside the geofence;

displaying, in the GUI, a map and one or more metrics, the map showing a store location at the center of the geofence and a concentration of intender consumers located within the geofence overlaid on the store location, the one or more metrics including a predicted and current amount of sales for the store location, the intender consumers corresponding to identity profiles having the geo-specific intender attributes;

adjusting, via the publication network, one or more bid parameters of an online demand side portal based on the concentration of intender customers displayed in the map and a difference between the current and predicted amount of sales shown in the GUI, the adjusted bid parameters increasing a number of placements accessible online within the geofence displayed on the map that receive bids from the demand side portal; and submitting, based on the adjusted bid parameters, one or more bids to an online bidding exchange that reserves one or more online placements for targeted content at a specified location on the publication network.

10. The method of claim 9, further comprising reserving the one or more placements of targeted content at the specified location in response to receiving a successful bid from the online demand side portal.

11. The method of claim 9, further comprising adjusting one or more bid parameters of the online demand side portal to modify a bid value for one or more placements accessible online within the geofence based on the one or more geo-specific intender attributes.

12. The method of claim 9, further comprising adjusting an allocation of cross channel media spend within the geofence based on the one or more geo-specific intender attributes.

13. The method of claim 9, wherein the intender attributes include at least one of a piece of demographic data, a piece of financial data, a brand propensity, a brand affinity, an attitude or behavioral propensity, a channel propensity, a product propensity, and a semantic code.

14. The method of claim 9, further comprising displaying a piece of targeted content at the one or more reserved placements;

determining a change in one or more key performance indicators (KPIs) based on impression data received for the displayed content; and re-configuring one or more of the adjusted bid parameters of the online demand side portal based on the one or more geo-specific intender attributes in response to determining an increase in the one or more KPIs.

15. The method of claim 14, wherein the KPIs include at least one of sales per consumer, return on advertising spend, store visits, and ad impressions.

16. The method of claim 9, further comprising displaying a piece of targeted content at the one or more reserved placements;

determining a change in the one or more key performance indicators (KPIs) based on impression data received for the displayed content and modifying at least one of the one or more geo-specific intender attributes based on determining a decrease or no change in the one or more KPIs.

17. The system of claim 1, wherein the processor is further configured to identify one or more geospecific intender attributes by accessing the memory of the data cloud to identify the intender attributes for the second population;

determining a scaled difference for each of the intender attributes included in the identity profiles of the first and second populations;

comparing the scaled difference for each of the intender attributes to a difference threshold; and identifying one or more intender attributes having a scaled difference that exceeds the difference threshold as the one or more geo-specific intender attributes.

18. The system of claim 1, wherein the processor is further configured to adjust an allocation of cross channel media spend within the geofence based the predicted amount of sales for the store location.

19. The method of claim 9, wherein the identifying one or more geospecific intender attributes further comprises accessing the memory of the data cloud to identify the intender attributes for the second population;

determining a scaled difference for each of the intender attributes included in the identity profiles of the first and second populations;

comparing the scaled difference for each of the intender attributes to a difference threshold; and identifying one or more intender attributes having a scaled difference that exceeds the difference threshold as the one or more geo-specific intender attributes.

20. The method of claim 9, further comprising adjusting an allocation of cross channel media spend within the geofence based the predicted amount of sales for the store location.

* * * * *

UNITED STATES PATENT AND TRADEMARK OFFICE
CERTIFICATE OF CORRECTION

PATENT NO. : 11,887,160 B2
APPLICATION NO. : 17/733618
DATED : January 30, 2024
INVENTOR(S) : Korada et al.

It is certified that error appears in the above-identified patent and that said Letters Patent is hereby corrected as shown below:

In the Specification

In Column 5, Line 53, delete "130" and insert --180-- therefor

In Column 7, Line 27, delete "166" and insert --168-- therefor

In Column 7, Line 29, delete "166" and insert --168-- therefor

In Column 8, Line 47, delete "318." and insert --332.-- therefor

In Column 9, Line 16, delete "318," and insert --332,-- therefor

In Column 10, Line 53, delete "should," and insert --should-- therefor

In Column 14, Line 51, delete "programing" and insert --programming-- therefor

In Column 15, Line 49, delete "708." and insert --610.-- therefor

In Column 19, Line 8, delete "214" and insert --714-- therefor

In the Claims

In Column 27, Line 59, in Claim 2, after "comprising", insert a linebreak

In Column 27, Line 63, in Claim 2, after "provider;", delete a linebreak

In Column 28, Line 25, in Claim 6, after "to", insert --:--

Signed and Sealed this
Third Day of December, 2024

Katherine Kelly Vidal
*Director of the United States Patent and Trademark Office*